United States Patent
Lohr et al.

(10) Patent No.: US 8,582,484 B2
(45) Date of Patent: Nov. 12, 2013

(54) SOFT-BUFFER MANAGEMENT OF A RE-TRANSMISSION PROTOCOL FOR UNICAST AND MULTICAST TRANSMISSIONS

(75) Inventors: Joachim Lohr, Langen (DE); Martin Feuersanger, Langen (DE); Alexander Golitschek Edler Von Elbwart, Langen (DE)

(73) Assignee: Panasonic Corporation, Osaka (JP)

(*) Notice: Subject to any disclaimer, the term of this patent is extended or adjusted under 35 U.S.C. 154(b) by 687 days.

(21) Appl. No.: 12/672,912

(22) PCT Filed: Jun. 25, 2008

(86) PCT No.: PCT/EP2008/005158
§ 371 (c)(1),
(2), (4) Date: May 7, 2010

(87) PCT Pub. No.: WO2009/021579
PCT Pub. Date: Feb. 19, 2009

(65) Prior Publication Data
US 2010/0296427 A1    Nov. 25, 2010

(30) Foreign Application Priority Data
Aug. 13, 2007 (EP) .................................. 07015909

(51) Int. Cl.
*H04H 20/71* (2008.01)
*H04J 3/26* (2006.01)

(52) U.S. Cl.
USPC .......................................... 370/312; 370/432

(58) Field of Classification Search
None
See application file for complete search history.

(56) References Cited

U.S. PATENT DOCUMENTS 7,447,504 B2  11/2008  Lohr
7,894,468 B2   2/2011  Chuah
(Continued)

FOREIGN PATENT DOCUMENTS

EP  1 389 847   2/2004
EP  1 612 984   1/2006
(Continued)

OTHER PUBLICATIONS

WO 2005/119969 Hamamoto Yasuo "Radio Transmission Method", Dec. 15, 2005.*

(Continued)

*Primary Examiner* — Derrick Ferris
*Assistant Examiner* — Kodzovi Acolatse
(74) *Attorney, Agent, or Firm* — Dickinson Wright PLLC

(57) ABSTRACT

The invention relates to a method for transmitting data packets between an eNodeB and a mobile node (MN) when simultaneously using the HARQ protocol with soft-combining for unicast and multicast transmissions. Unicast transmissions are assigned to HARQ processes by the eNB, whereas multicast transmissions need to be assigned to a HARQ process by the MN. According to a first aspect, the soft-buffer memory is strictly separated into a unicast and multicast section, and HARQ protocol operations for unicast and multicast are independent. Due to the separation, the eNB can still correctly assign the unicast transmissions to a HARQ process. According to a second aspect, the soft-buffer is not separated but commonly used for unicast and multicast. However, in order for the eNB to still be able to correctly assign the unicast transmissions to a free HARQ process, the MN assigns the multicast transmission depending on a rule, known also to the eNB.

18 Claims, 5 Drawing Sheets

(56) References Cited

U.S. PATENT DOCUMENTS

| | | | |
|---|---|---|---|
| 2006/0002416 A1 | 1/2006 | Yagihashi | |
| 2006/0179387 A1* | 8/2006 | Taffin et al. | 714/746 |
| 2008/0059859 A1* | 3/2008 | Marinier et al. | 714/748 |
| 2008/0192661 A1* | 8/2008 | Hamamoto et al. | 370/310 |
| 2009/0207771 A1* | 8/2009 | Lindskog et al. | 370/312 |

FOREIGN PATENT DOCUMENTS

| | | |
|---|---|---|
| EP | 1 612 984 A3 | 1/2006 |
| EP | 1 748 593 | 1/2007 |
| JP | 2004-289830 | 10/2004 |
| JP | 2005-536759 | 11/2005 |
| JP | 2006-020044 | 1/2006 |
| JP | 2007-082192 | 3/2007 |
| WO | 2005/125226 | 12/2005 |
| WO | 2005/125226 A3 | 12/2005 |

OTHER PUBLICATIONS

International Search Report dated Aug. 20, 2008.
Notice of Reasons for Rejection dated Sep. 4, 2012, with English translation.

* cited by examiner

≡≡≡ multicast data
▨▨▨ unicast data multicast data
unicast data

SYNC: Protocol to synchronise data used to generate a certain radio frame

SOFT-BUFFER MANAGEMENT OF A RE-TRANSMISSION PROTOCOL FOR UNICAST AND MULTICAST TRANSMISSIONS

FIELD OF THE INVENTION

The invention relates to a method for transmitting data packets between a radio control entity and a mobile, when using a re-transmission protocol with soft-combining. In particular, the invention provides different method steps so as to allow a simultaneous use of the re-transmission protocol with soft-combining for unicast and multicast transmissions. Furthermore, the invention relates to a radio control entity and a mobile node, that participate in the invention.

TECHNICAL BACKGROUND

W-CDMA (Wideband Code Division Multiple Access) is a radio interface for IMT-2000 systems (International Mobile Telecommunication system), which was standardized for use as the 3rd generation wireless mobile telecommunication system. It provides a variety of services such as voice services and multimedia mobile communication services in a flexible and efficient way. The standardization bodies in Japan, Europe, USA and other countries have jointly organized a project called the 3rd Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4, Release 5 and Release 6.

A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

However, knowing that user and operator requirements and expectations will continue to evolve, the 3GPP has begun considering the next major step or evolution of the 3G standard to ensure the long-term competitiveness of 3G.

The 3GPP recently launched a study item "Evolved UTRA and UTRAN" better known as "Long Term Evolution (LTE)". The study will investigate means of achieving major leaps in performance in order to improve service provisioning, and to reduce user and operator costs. It is generally assumed that Internet Protocols (IP) will be used in mobility control, and that all future services will be IP-based. Therefore, the focus of the evolution is on enhancements to the packet-switched (PS) domain of legacy UMTS systems.

The main objectives of the evolution are to further improve service provisioning, and reduce user and operator costs, as already mentioned. More specifically, some key performance, capability and deployment requirements for the long-term evolution (LTE) are inter alia:

significantly higher data rates compared to HSDPA and HSUPA (envisioned are target peak data rates of more than 100 Mbps over the downlink and 50 Mbps over the uplink), Mean user throughput improved by factors 2 and 3 for respectively uplink (UL) and downlink (DL), high data rates with wide-area coverage, cell-edge user throughput improved by a factor 2 for uplink and downlink, uplink and downlink spectrum efficiency respectively improved by factors 2 and 3, significantly reduced latency in the user plane in the interest of improving the performance of higher layer protocols (for example, TCP) as well as reducing the delay associated with control plane procedures (for instance, session setup), and stand-alone system operation in spectrum allocations of different sizes ranging from 1.25 MHz to 20 MHz.

One other deployment-related requirement for the long-term evolution study is to allow for a smooth migration to these technologies.

The ability to provide high bit rates is a key measure for LTE. Multiple parallel data stream transmission to a single terminal, using multiple-input-multiple-output (MIMO) techniques, is one important component to reach this. Larger transmission bandwidth and at the same time flexible spectrum allocation are other pieces to consider when deciding what radio access technique to use. The choice of adaptive multi-layer OFDM (Orthogonal Frequency Division Multiplexing), Adaptive Multi Layer (AML)-OFDM, in downlink will not only facilitate to operate at different bandwidths in general but also large bandwidths for high data rates in particular. Varying spectrum allocations, ranging from 1.25 MHz to 20 MHz, are supported by allocating corresponding numbers of AML-OFDM subcarriers. Operation in both paired and unpaired spectrum is possible as both time-division and frequency-division duplex is supported by AML-OFDM.

OFDM with Frequency-Domain Adaptation

The AML-OFDM-based downlink has a frequency structure based on a large number of individual sub-carriers with a spacing of 15 kHz. This frequency granularity facilitates to implement dual-mode UTRA/E-UTRA terminals. The ability to reach high bit rates is highly dependent on short delays in the system and a prerequisite for this is short sub-frame duration. Consequently, the LTE sub-frame duration is set as short as 1 ms in order to minimize the radio-interface latency. In order to handle different delay spreads and corresponding cell sizes with a modest overhead, the OFDM cyclic prefix length can assume two different values. The shorter 4.7 ms cyclic prefix is enough to handle the delay spread for most unicast scenarios. With the longer cyclic prefix of 16.7 ms very large cells, up to and exceeding 120 km cell radiuses, with large amounts of time dispersion can be handled. In this case, the length is extended by reducing the number of OFDM symbols in a sub-frame.

The basic principle of Orthogonal Frequency Division Multiplexing (OFDM) is to split the frequency band into a number of narrowband channels. Therefore, OFDM allows transmitting data on relatively flat parallel channels (subcarriers) even if the channel of the whole frequency band is frequency selective due to a multipath environment. Since the subcarriers experience different channel states, the capacities of the subcarriers may vary and permit a transmission on each subcarrier with a distinct data-rate. Hence, subcarrier wise (frequency domain) Link Adaptation (LA) by means of Adaptive Modulation and Coding (AMC) increases the radio efficiency by transmitting different data-rates over the subcarriers.

OFDMA allows multiple users to transmit simultaneously on the different subcarriers per OFDM symbol. Since the probability that all users experience a deep fade in a particular subcarrier is very low, it can be assured that subcarriers are assigned to the users who see good channel gains on the corresponding sub-carriers. When allocating resources in the downlink to different users in a cell, the scheduler takes information on the channel status experienced by the users for the subcarriers into account. The control information signaled by the users, i.e. CQI, allows the scheduler to exploit the multi-user diversity, thereby increasing the spectral efficiency.

Two different resource allocation methods can be distinguished when considering a radio access scheme that distributes an available frequency spectrum among different users as in OFDMA. The first allocation mode or "localized mode" tries to benefit fully from frequency scheduling gain by allocating the subcarriers on which a specific UE experiences the best radio channel conditions. Since this scheduling mode requires associated signaling (resource allocation signaling, CQI in uplink), this mode would be best suited for non-real time, high data rate oriented services. In the localized resource allocation mode a user is allocated continuous blocks of subcarriers.

The second resource allocation mode or "distributed mode" relies on the frequency diversity effect to achieve transmission robustness by allocating resources that are scattered over time and frequency grid. The fundamental difference with localized mode is that the resource allocation algorithm does not try to allocate the physical resources based on some knowledge on the reception quality at the receiver but select more or less randomly the resource it allocates to a particular UE. This distributed resource allocation method seems to be best suited for real-time services as less associated signaling (no fast CQI, no fast allocation signaling) relative to "localized mode" is required.

The two different resource allocation methods are shown in FIG. 1 for an OFDMA based radio access scheme. As can be seen from the left-hand part of the figure, which depicts the localized transmission mode, the localized mode is characterized by the transmitted signal having a continuous spectrum that occupies a part of the total available spectrum. Different symbol rates (corresponding to different data rates) of the transmitted signal imply different bandwidths (time/frequency bins) of a localized signal. On the other hand, as can be seen from the right-hand part of the figure, distributed mode is characterized by the transmitted signal having a non-continuous spectrum that is distributed over more or less the entire system bandwidth (time/frequency bins).

Evolved-MBMS

In the following there will be briefly described an exemplary multicast service to which the previous embodiments of the invention may be applied. As already mentioned such a multicast service can be the Multicast Broadcast Multimedia Service (MBMS)

There will be support for MBMS right from the first version of the LTE specifications. However, specifications for E-MBMS are in early stages. Two important scenarios have been identified for E-MBMS. One scenario is the single-cell broadcast, and the second one is the MBMS Single Frequency Network (MBSFN).

MBSFN is a new feature that is being introduced in the LTE specification. MBSFN is envisaged for delivering services such as Mobile TV using the LTE infrastructure, and is expected to be a competitor to DVB-H-based TV broadcast. In MBSFN, the transmission happens from a time-synchronized set of eNBs using the same resource block. This enables over-the-air combining, thus improving the Signal-to-Interference plus Noise-Ratio (SINR) significantly, compared to non-SFN operation. The Cyclic Prefix (CP) used for MBSFN is slightly longer, and this enables the UE to combine transmissions from different eNBs, thus somewhat negating some of the advantages of SFN operation. There will be six symbols in a slot of 0.5 ms for MBSFN operation versus seven symbols in a slot of 0.5 ms for non-SFN operation.

The overall user-plane architecture for MBSFN operation is shown in FIG. 8. 3GPP has defined a SYNC protocol between the E-MBMS gateway and the eNBs to ensure that the same content is sent over-the-air from all the eNBs. As shown in FIG. 8, the eBM-SC is the source of the MBMS traffic, and the E-MBMS gateway is responsible for distributing the traffic to the different eNBs of the MBSFN area. IP multicast may be used for distributing the traffic from the E-MBMS gateway to the different eNBs. 3GPP has defined a control plane entity, known as the MBMS Coordination Entity (MCE) that ensures that the same resource block is allocated for a given service across all the eNBs of a given MBSFN area. It is the task of the MCE to ensure that the RLC/MAC layers at the eNBs are appropriately configured for MBSFN operation. 3GPP has currently assumed that header compression for MBMS services will be performed by the E-MBMS gateway. Both single-cell MBMS and MBSFN will typically use point-to-multipoint mode of transmission.

However, HARQ operation will probably only be supported for single-cell MBMS transmissions.

For E-MBMS, the following definitions are introduced. FIG. 9 depicts the new MBMS definitions.

MBSFN Synchronization Area: An area of the network where all NodeBs/eNodeBs can be synchronized and perform MBSFN transmissions. MBSFN Synchronization Areas are capable of supporting one or more MBSFN Areas. On a given frequency layer, a NodeB/eNodeB can only belong to one MBSFN Synchronization Area. MBSFN Synchronization Areas are independent from the definition of MBMS Service Areas.

MBSFN Transmission or a transmission in MBSFN mode: a simulcast transmission technique realised by transmission of identical waveforms at the same time from multiple cells. An MBSFN Transmission from multiple cells within the MBSFN Area is seen as a single transmission by a UE.

MBSFN Area: an MBSFN Area consists of a group of cells within an MBSFN Synchronization Area of a network, which are co-ordinated to achieve an MBSFN Transmission. A cell within an MBSFN Synchronization Area may form part of multiple MBSFN Areas, each characterized by different transmitted content and participating set of cells.

MBSFN Area Transmitting and Advertising Cell: A cell within an MBSFN Area which is contributing to the MBSFN Transmission and advertises within the cell the availability of the MBSFN Transmission.

MBSFN Area Transmitting-Only Cell: A cell within an MBSFN Area which is contributing to the MBSFN Transmission but does not advertise within the cell the availability of the MBSFN Transmission. The need for this type of cell is FFS.

MBSFN Area Reserved Cell: A cell within an MBSFN Area, which does not contribute to the MBSFN Transmission. The cell may be allowed to transmit for other services but at restricted power on the resource allocated for the MBSFN transmission e.g. PTP for users at the centre of the cell.

LTE Architecture

The overall architecture is shown in FIG. 2 and a more detailed representation of the E-UTRAN architecture is given in FIG. 3. The E-UTRAN consists of evolved Node Bs (eNB), providing the E-UTRA user plane (PDCP/RLC/MAC/PHY) and control plane (RRC) protocol terminations towards the mobile node (referred to in the following as UE or MN).

The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. Further, it performs many functions including radio resource management, admission control, scheduling, enforcement of negotiated UL-QoS (Quality of Service), cell information broadcast, ciphering/deciphering of user and control plane data, and compression/decompression of DL/UL user plane packet headers. The eNBs are interconnected with each other by means of the X2 interface. The eNBs are also connected by means of the S1 interface to the EPC (Evolved Packet Core), more specifically to the MME (Mobility Management Entity) by means of the S1-MME, and to the Serving Gateway (S-GW) by means of the S1-U. The S1 interface supports a many-to-many relation between MMEs/Serving Gateways and eNBs.

The S-GW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and Packet Data Network Gateway). For idle state UEs, the S-GW terminates the DL data path and triggers paging when DL data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the S-GW for a UE at the initial attach and at time of intra-LTE handover involving Core Network (CN) node relocation. It is responsible for authenticating the user (by interacting with the Home Subscriber Server, HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

L1/2 Control Signaling

In order to Inform the scheduled users about their allocation status, transport format and other data related information (e.g. HARQ), L1/L2 control signaling needs to be transmitted on the downlink along with the data. The control signaling needs to be multiplexed with the downlink data in a sub frame (assuming that the user allocation can change from sub frame to sub frame). Here, it should be noted, that user allocation might also be performed on a TTI (Transmission Time Interval) basis, where the TTI length is a multiple of the sub frames. The TTI length may be fixed in a service area for all users, may be different for different users, or may even by dynamic for each user. Generally, the L1/2 control signaling then needs only to be transmitted once per TTI. However, in some cases it may make sense to repeat the L1/2 control signaling within a TTI in order to increase reliability.

Generally, the information sent on the L1/L2 control signaling may be separated into the following two categories:

Shared Control Information (SCI) carrying Cat 1 information. The SCI part of the L1/L2 control signaling contains information related to the resource allocation (indication). The SCI typically contains the following information:
  User identity, indicating the user which is allocated.
  RB allocation Information, indicating the resources (Resource Blocks, RBs) on which a user is allocated. Note, that the number of RBs on which a user is allocated can be dynamic.
  Optional: Duration of assignment, if an assignment over multiple sub frames (or TTIs) is possible.
  Depending on the setup of other channels and the setup of the Dedicated Control Information (DCI), the SCI may additionally contain information such as ACK/NACK for uplink transmission, uplink scheduling information, information on the DCI (resource, MCS, etc.).
Dedicated Control Information (DCI) carrying Cat 2/3 information. The DCI part of the L1/L2 control signaling contains information related to the transmission format (Cat 2) of the data transmitted to a scheduled user indicated by Cat 1. Moreover, in case of application of (hybrid) ARQ it carries HARQ (Cat 3) information. The DCI needs only to be decoded by the user scheduled according to Cat 1. The DCI typically contains information on:
  Cat 2: Modulation scheme, transport block (payload) size (or coding rate), MIMO related information, etc.
  Cat 3: HARQ related information, e.g. hybrid ARQ process number, redundancy version, re-transmission sequence number.

Hybrid ARQ Schemes

A common technique for error detection and correction in packet transmission systems over unreliable channels is called Hybrid Automatic Repeat reQuest (HARQ). Hybrid ARQ is a combination of Forward Error Correction (FEC) and ARQ.

Automatic Repeat-reQuest (ARQ) is an error control method for data transmission which uses acknowledgments and timeouts to achieve reliable data transmission. An acknowledgment is a message sent by the receiver to the transmitter to indicate that it has correctly received a data packet. If the sender does not receive an acknowledgment before the timeout, being a reasonable time interval for receiving an acknowledgment, it usually re-transmits the frame until it receives an acknowledgment or exceeds a predefined number of re-transmissions.

Forward error correction is employed to control errors in data transmissions, wherein the sender adds redundant data to its messages. This enables the receiver to detect whether an error has occurred, and further allows to correct some errors without requesting additional data from the sender. Consequently, since within a certain limit FEC allows to correct some of the errors, re-transmission of data packets can often be avoided. However, due to the additional data that is appended to each data packet, this comes at the cost of higher bandwidth requirements.

If a FEC encoded packet is transmitted and the receiver fails to decode the packet correctly (errors are usually checked by a CRC (Cyclic Redundancy Check)), the receiver requests a re-transmission of the packet.

Depending on the information (generally code bits/symbols) of which the transmission is composed of, and depending on how the receiver processes the information, the following hybrid ARQ schemes are defined:

Type I: The error detection information (such as CRC) is added to the data packet, which is then encoded with a forward error correction code (such as Reed-Solomon code or Turbo code). In the receiver the FEC code is decoded and the quality of the packet is determined. If the channel quality is good enough, all transmission errors should be correctable, and the receiver can decode the actual data packet correctly. If the channel quality is bad and not all transmission errors can be corrected, then the received coded data packet is discarded and a re-transmission for said data packet is requested by the receiver. In this type of HARQ the re-transmission uses the same FEC code as during the initial transmission. Further, the re-transmission data packets contain identical information (code bits/symbols) to the initial transmission. Resulting from the above, the received transmissions are all decoded separately in the receiver.

Type II: According to the second type of HARQ, if the receiver fails to decode a packet correctly, the receiver stores the information of the (erroneously received) encoded packet as soft information (soft bits/symbols) and a re-transmission is requested from the sender. This implies that a soft-buffer is required at the receiver. Re-transmissions can be composed out of identical, partly-identical or non-identical information (code bits/symbols) compared to the initially transmitted data packet. When receiving a re-transmission the receiver combines the stored information from the soft buffer and the currently received information and tries to decode the packet based on the combined information. The combining of transmissions refers to so called soft-combining, where multiple received code bits/symbols are likelihood combined and solely received code bits/symbols are code combined. Common methods for soft-combining are Maximum Ratio Combining (MRC) of received modulation symbols and log-likelihood ratio (LLR) combining (LLR combining only works for code bits). Type II HARQ schemes are more sophisticated than Type I HARQ schemes, since the probability for a correct reception of a data packet increases with each received re-transmission. This increase comes at the cost of a HARQ soft-buffer at the receiver.

The Type II HARQ scheme can be used to perform dynamic link adaptation by controlling the amount of information to be re-transmitted. E.g. if the receiver detects that decoding has been almost successful, it can request only a small piece of information for the next re-transmission (smaller number of code bits/symbols than in the previous transmission) to be transmitted. In this case it might happen that it is even theoretically not possible to correctly decode the re-transmission packet by itself, wherein this is referred to as non-self-decodable re-transmissions.

Type III: This is a subset of the Type II HARQ with the restriction that each transmission, be it an initial or a re-transmission, must be self decodable.

The HARQ mechanism has been defined for unicast data transmissions, wherein there are two levels of re-transmissions for providing reliability, namely, the Hybrid Automatic Repeat reQuest (HARQ) at the MAC layer and the outer ARQ at the RLC layer.

However, recently the support of HARQ with soft-combining has been agreed in LTE for multicast transmission, such as MBMS (Multicast Broadcast Multimedia Services). UMTS doesn't support such functionality for multicast transmissions. Therefore, there are some technical challenges introduced, which need to be addressed. One of the problems is the soft-buffer management in case of simultaneously supporting HARQ operation with soft-combining for unicast and multicast transmissions.

Some simple solution would be to add some extra soft-buffer memory for the MBMS HARQ operation in the UE, in addition to the soft-buffer memory used for normal unicast HARQ protocol operation. This approach would not require any changes in the UE respectively eNB behaviour with regard to the HARQ protocol. However, since soft-buffer memory in a mobile terminal is very expensive, this solution might not be very sensible.

SUMMARY OF THE INVENTION

Therefore, in view of the above problems in the state of the art, one object of the invention is to provide a method for exchanging data packets via unicast and multicast using a re-transmission protocol that uses a buffer for soft-combining.

A more specific object of the invention is to provide a soft-buffer management scheme for simultaneous unicast and multicast transmissions, supporting a re-transmission protocol that uses a soft-buffer for soft-combining, which avoids the need of extra soft-buffer memory in a mobile node.

At least one of the above objects is solved by the subject matter of the independent claims. Advantageous embodiments of the invention are subject-matters of the dependent claims.

The HARQ protocol operation according to the invention supports both unicast and multicast transmissions, thereby avoiding extra soft-buffer memory for multicast transmission in the mobile node. In said respect, the invention uses a common soft-buffer management for unicast and multicast transmissions, wherein the soft-buffer is shared when processing unicast and multicast data packets. The radio control entity, when transmitting a unicast data packet, is able to specify which process of the re-transmission protocol shall be used by the mobile node, in case the unicast data packet could not be decoded correctly in the mobile node. The process, that is decided in the radio control entity, is signaled to the mobile node, so that the mobile node knows to which process the incoming unicast data packet should be assigned. In contrast thereto, the radio control entity is not able to specify a process for multicast data packets, since each of the plurality of mobile nodes receiving the multicast data packet may have different processes available for processing the multicast data packet in case of a transmission error. Thus, the mobile node is responsible for allocating the multicast data packet to a particular process of the re-transmission protocol, while the radio control entity may enable the mobile node to identify a data packet as transmitted via multicast.

Consequently, the radio control entity would not know which process was selected by the mobile node for a transmitted multicast data packet. However, the radio control entity needs to know all available and unavailable processes so as to correctly assign the unicast data packets to a process with an associated empty soft-buffer region. Thus, it is necessary to enable the radio control entity to know at any given time the status of the re-transmission protocol processes.

According to one aspect of the invention, the soft-buffer management of the re-transmission protocol in the mobile node is strictly divided in two parts respectively supporting the unicast and multicast transmissions. The re-transmission protocol uses several processes, each process being associated to a soft-buffer region for implement the soft-combining, wherein the processes are distributed between the two parts. Thus, the HARQ protocol operation with the soft-buffer management for unicast transmissions does not change but for the reduction of the available soft-buffer size and the available processes. That is, the radio control entity is still able to explicitly specify which process the mobile node shall use for a particular data packet belonging to a particular unicast service. Also, the radio control entity is able to keep track of those processes that are currently unused so as to correctly assign subsequent data packets, because the radio control entity is the only entity deciding on the use of the processes within the unicast section. That is, the re-transmission protocol with the processes belonging to the unicast section is operated independently from the re-transmission protocol with the processes belonging to the multicast section. Thus the radio control entity is enabled to exactly know the status of the processes belonging to the unicast section at any given time.

In contrast thereto, the radio control entity cannot explicitly specify a process of the re-transmission protocol for multicast transmissions, since several mobile nodes receive the same multicast data packet, while each of the mobile nodes may have at that time a different status of the processes. For instance, the only process empty for a particular mobile node, may be already in use in another mobile node. In order to solve this, the soft-buffer of the re-transmission protocol for multicast data packets is managed by the mobile node, as already mentioned. That is, when the mobile node receives and identifies a multicast data packet it decides for itself to which process of the multicast section the multicast data packet is to be assigned. Though the radio control entity does not know the actual status of the different processes of the multicast section, this is not necessary since the allocation of a process for a multicast data packet is solely controlled by the mobile node, provided that the radio control entity enables the mobile node to identify the data packet as a data packet transmitted via multicast. Furthermore, in spite of the radio control entity not knowing the actual status of the multicast processes, this is not necessary for the operation of the unicast part of the re-transmission protocol operation due to the strict separation of unicast and multicast protocol operation.

In summary, the first aspect of the invention ensures the synchronization between the mobile node and the radio control entity regarding the use of the re-transmission with soft-combining for unicast data packets, by strictly separating the soft-buffer into a unicast and multicast section and thereby also separating the re-transmission protocol operation for unicast and multicast data transmissions from each other.

According to another aspect of the invention, the soft-buffer in the mobile node is not separated compared to the first aspect of the invention. Instead, the complete soft-buffer is used for unicast as well as for multicast transmissions, i.e. the same processes can be used for processing unicast and multicast data packets. As already mentioned above, the radio control entity is able to explicitly specify the re-transmission protocol process in the mobile node for a particular unicast transmission, but is again unable to specify a process of the re-transmission protocol for multicast transmissions because of the several mobile nodes having a different process status (available or unavailable) at a given time. However, the radio control entity shall still be able to correctly address the processes of the re-transmission protocol for the unicast transmissions. Therefore, the radio control entity needs to know which processes are available for assigning an imminent transmission of a unicast data packet to a process.

According to the above described first aspect, this was rather simple since the re-transmission protocol was performed separately for unicast and multicast transmissions. In contrast, for the re-transmission protocol operation according to the second aspect of the invention, it is necessary to enable the radio control entity to know about the current status of the processes, so that the radio control entity correctly selects a process for a unicast data packet which is not already in use for storing an erroneously received multicast data packet. However, since the mobile nodes are responsible for distributing a multicast data packet to a process of the re-transmission protocol in case the multicast data packet is not correctly decoded, a rule for the mobile node to allocate a multicast data packet to a process is to be defined, the rule being also known to the radio control entity. Thus, the radio control entity can infer from the rule to which process a multicast data packet, that is to be transmitted to the mobile node, will be assigned by the mobile node. Consequently, the radio control entity knows the status of all processes in the mobile node, and can correctly assign a unicast data packet to a process.

One embodiment of the invention provides a method for transmitting data packets from a radio control entity to a mobile node in a unicast and multicast transmission mode. A re-transmission protocol uses a plurality of processes for the transmission of the unicast and multicast data packets. Further, the re-transmission protocol uses a receiving buffer in the mobile node which is composed of a plurality of regions each associated with one of the plurality of processes of the re-transmission protocol.

The receiving buffer is used to store therein received data packets, which could not be decoded correctly by the mobile node, for later use with corresponding re-transmission data packets. The receiving buffer of the re-transmission protocol in the mobile node is configured for use with the unicast and the multicast transmission mode. In more detail, the receiving buffer is divided into a unicast section and a multicast section. Then, the plurality of regions of the receiving buffer with the associated plurality of processes are distributed among the unicast and multicast section. The radio control entity is informed about the distribution of the regions and the associated processes among the unicast and multicast section. The radio control entity transmits a unicast data packet to the mobile node, wherein the unicast data packet is assigned to a process belonging to the unicast section of the receiving buffer. Also, the radio control entity transmits a multicast data packet to the mobile node, wherein the multicast data packet is assigned to the multicast section of the receiving buffer.

According to an advantageous embodiment of the invention, upon receiving a multicast data packet from the radio control entity, the mobile node assigns the multicast data packet to a process belonging to the multicast section, in case the multicast data packet could not be decoded correctly. One advantage thereof is that the mobile node has the control of the allocation of multicast data packets to a process, and thus the eNB is no longer responsible for that.

In a further embodiment of the invention, the mobile node may decide on the number of processes to be assigned to the unicast and multicast section. In addition, it is decided on the amount of receiving buffer constituting the corresponding region of the receiving buffer that is associated with each of the processes assigned to the unicast and multicast section. Then, the radio control entity is informed about the number of processes and the amount of receiving buffer of each region associated with a process that is assigned to the unicast and multicast section. Thus, the radio control entity is able to correctly assign the unicast data packets to a unicast process.

According to a different embodiment of the invention, a configuration information message is transmitted from the mobile node to the radio control entity. The configuration information message comprises a bitmap, wherein each bit of the bitmap corresponds to one process of the plurality of processes of the re-transmission protocol. Further, each bit of the bitmap indicates whether the corresponding process belongs to the unicast or multicast section of the receiving buffer. The radio control entity is thereby easily enabled to identify those processes that belong to the unicast and multicast section.

According to a more advantageous embodiment of the invention, a region of the multicast section, storing a received multicast data packet, is emptied upon the expiry of a timer. The timer is initiated when the re-transmission protocol stores the multicast data packet in said region of the multicast section. One advantage is that a too long reservation of the region of the multicast section due to a missing re-transmission is avoided.

Another different embodiment of the invention relates to second control information for enabling the reception of the multicast data packet in the mobile node. The second control information is transmitted from the radio control entity to the mobile node. The second control information comprises a predetermined indicator indicating that the corresponding data packet will be transmitted to the mobile node in a multicast transmission mode. Then, the multicast data packet is transmitted from the radio control entity to the mobile node. By transmitting the predetermined indicator to the mobile node along with the data packet, the MN is efficiently informed about the type of the data packet, i.e. a multicast data packet has been received.

Another embodiment of the invention provides a method for transmitting data packets from a radio control entity to a mobile node in a unicast and multicast transmission mode. A re-transmission protocol uses a plurality of processes for the transmission of the unicast and multicast data packets. Further, the re-transmission protocol uses a receiving buffer in the mobile node, composed of a plurality of regions. Each of the regions is associated with one of the plurality of processes of the re-transmission protocol, to store therein received data packets, which could not be decoded correctly by the mobile node.

The data packets are stored for later use with corresponding re-transmission data packets. The radio control entity transmits a unicast data packet to the mobile node, wherein the unicast data packet is assigned to one of the plurality of processes of the re-transmission protocol. The radio control entity transmits a multicast data packet to the mobile node, wherein the multicast data packet is assigned by the mobile node to one of the plurality of processes of the re-transmission protocol, depending on a rule known to the mobile node and the radio control entity.

In an advantageous embodiment of the invention, the processes of the re-transmission protocol whose associated regions of the receiving buffer in the mobile node are empty, are determined based on the previous decisions of the radio control entity to assign a previous unicast data packet to a process of the re-transmission protocol. The determination is also based on the transmission of a previous multicast data packet to the mobile node in combination with the rule used by the mobile node to assign the previous multicast data packet to a process of the re-transmission protocol.

According to another embodiment of the invention, the mobile node receives the second control information and the multicast data packet. Then, upon receiving the multicast data packet in the mobile node, the multicast data packet is identified as a data packet transmitted in the multicast transmission mode based on the predetermined indicator in the second control information. In case the multicast data packet could not be decoded correctly by the mobile node, the mobile node stores the multicast data packet in a region of the receiving buffer depending on the rule.

Relating to a further embodiment of the invention, the plurality of processes of the re-transmission protocol are respectively identified by a plurality of identifiers in ascending or descending order. The rule instructs the mobile node to assign the multicast data packet to the process with the lowest or highest identifier, having an associated empty region in the receiving buffer.

In a more advantageous embodiment of the invention the mobile node decides on the number of processes of the re-transmission protocol to be used for storing multicast data packets, which could not be decoded correctly by the mobile node, in the associated regions of the receiving buffer. The radio control entity is informed about the decided number of processes. In case the radio control entity knows about the maximum number of processes, it is able to more efficiently use the available resources.

Another embodiment of the invention provides radio control entity for transmitting data packets to a mobile node in a unicast and multicast transmission mode. A re-transmission protocol uses a plurality of processes for the transmission of the unicast and multicast data packets. Further, the re-transmission protocol uses a receiving buffer in the mobile node, composed of a plurality of regions. Each region is associated with one of the plurality of processes of the re-transmission protocol, to store therein received data packets, which could not be decoded correctly by the mobile node. The data packets are stored for later use with corresponding re-transmission data packets. A receiver in the radio control entity receives from the mobile node information about a division of the receiving buffer into a unicast and multicast section and about the distribution of the regions and the associated processes among the unicast and multicast section. A transmitter of the radio control entity transmits a unicast data packet to the mobile node. The unicast data packet is assigned to a process belonging to the unicast section of the receiving buffer. The transmitter further transmits a multicast data packet to the mobile node, wherein the multicast data packet is assigned to the multicast section of the receiving buffer.

Another embodiment of the invention provides a mobile node for receiving data packets from a radio control entity transmitted in a unicast and multicast transmission mode. A re-transmission protocol uses a plurality of processes for the transmission of the unicast and multicast data packets. Further, the re-transmission protocol uses a receiving buffer in the mobile node, composed of a plurality of regions. Each region is associated with one of the plurality of processes of the re-transmission protocol, to store therein received data packets, which could not be decoded correctly by the mobile node. The data packets are stored for later use with corresponding re-transmission data packets. A processor in the mobile node configures the receiving buffer of the re-transmission protocol for use with the unicast and multicast transmission mode. This is done by dividing the receiving buffer into a unicast section and a multicast section and by distributing the plurality of regions of the receiving buffer and the associated plurality of processes among the unicast and multicast section.

A receiver of the mobile node receives from the radio control entity a unicast data packet, assigned to a process belonging to the unicast section of the receiving buffer. Further, the receiver receives from the radio control entity a multicast data packet, assigned to the multicast section of the receiving buffer.

Another embodiment of the invention provides a radio control entity for transmitting data packets to a mobile node in a unicast and multicast transmission mode. A re-transmission protocol uses a plurality of processes for the transmission of the unicast and multicast data packets. Further, the re-transmission protocol uses a receiving buffer in the mobile node, composed of a plurality of regions. Each region is associated with one of the plurality of processes of the re-transmission protocol, to store therein received data packets, which could not be decoded correctly by the mobile node. The data packets are stored for later use with corresponding re-transmission data packets. A transmitter of the radio control entity transmits to the mobile node a unicast data packet, assigned to one of the plurality of processes of the re-transmission protocol. Also, the transmitter further transmits to the mobile node a multicast data packet. A memory of the radio control entity store a rule depending on which the multicast data packet is assigned by the mobile node to one of the plurality of processes of the re-transmission protocol.

Another embodiment of the invention provides a mobile node for receiving data packets from a radio control entity transmitted in a unicast and multicast transmission mode. A re-transmission protocol uses a plurality of processes for the transmission of the unicast and multicast data packets. The re-transmission protocol uses a receiving buffer in the mobile node, composed of a plurality of regions. Each region is associated with one of the plurality of processes of the re-transmission protocol, to store therein received data packets, which could not be decoded correctly by the mobile node. The data packets are stored for later use with corresponding re-transmission data packets. A receiver in the mobile node receives from the radio control entity a unicast data packet, assigned to one of the plurality of processes of the re-transmission protocol. The receiver further receives from the radio control entity a multicast data packet. A processor assigns the received multicast data packet to one of the plurality of processes of the re-transmission protocol, depending on a rule known to the mobile node and the radio control entity.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION

Definitions

In the following a definition of a few terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

A re-transmission protocol supporting soft-combining uses several processes to transmit data packets and store data packets, which could not be decoded correctly, in associated regions of a soft-buffer in a mobile node. Each process is identified by a process ID, and unicast data packets are explicitly assigned by a radio control entity to a particular process of the re-transmission protocol. Thus, in case the unicast data packet could not be decoded correctly, the process in the mobile node stores said unicast data packet in its associated soft-buffer region.

The following paragraphs will describe various embodiments of the invention. For exemplary purposes only, some of the embodiments are outlined in relation to a 3GPP/LTE communication system. It should be noted that the invention may be advantageously used for example in connection with a mobile communication system such as the 3GPP/LTE communication system, but the invention is not limited to its use in this particular exemplary communication network.

The explanations given in the Technical Background section above are intended to better understand the specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems.

Figure 1:
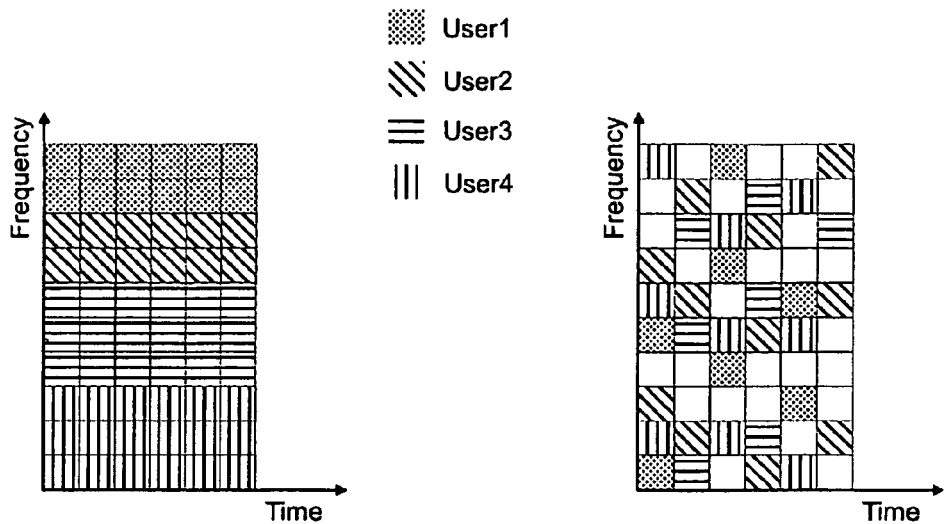
FIG. 1 illustrates the difference between a localized and distributed resource allocation method for OFDM based communication systems.
Figure 2:
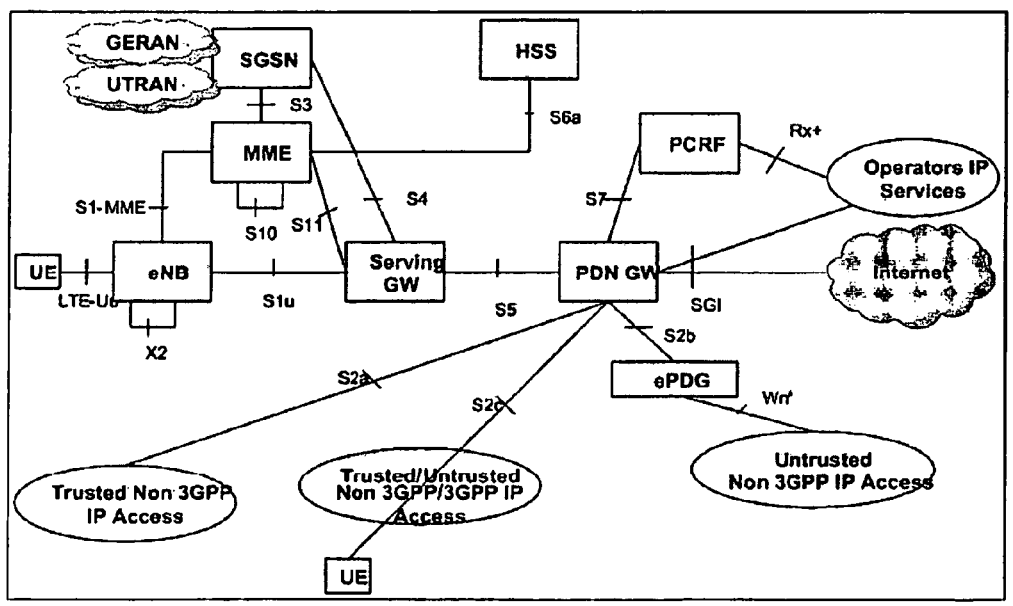
FIG. 2 illustrates the high-level architecture of an LTE system.
Figure 3:
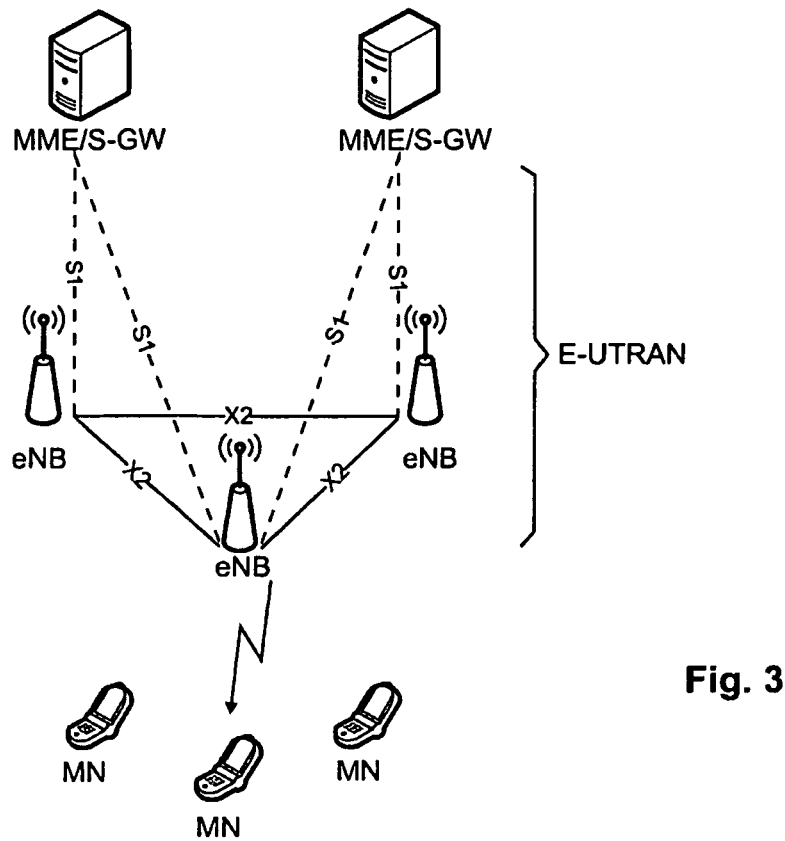
FIG. 3 illustrates the overall E-UTRAN architecture.

Before discussing the various embodiments of the invention in more detail, the Hybrid ARQ protocol will be further illustrated as an example for the re-transmission protocol as defined before. In addition, the embodiments of the invention will be described for the exemplary scenario of an LTE system as illustrated in FIG. 3, in which an eNB transmits data packets to a MN via an unicast and multicast transmission mode. Consequently, the radio control entity mentioned so far is in this exemplary scenario the eNB. However, as will become apparent to a skilled person, the radio control entity may be as well a NodeB, an RNC or an access router, depending on the communication system and implementation.

As already commented on previously, the HARQ protocol was usually performed for only unicast data transmissions, wherein two levels of re-transmissions for providing reliability are present, namely the HARQ at the MAC layer and the outer ARQ at the RLC layer. The outer ARQ is required to handle residual errors that are not corrected by HARQ, which in turn can be kept simple by using a single bit error-feedback mechanism, i.e. ACK/NACK. The HARQ protocol uses several HARQ processes in the eNB and the mobile node to transmit and receive data packets. In particular, at first it is decided which HARQ process to use for a particular unicast data packet transmission. Subsequently, the decided HARQ process is used by the eNB for transmitting the unicast data packet to the MN. Accordingly, the eNB has a transmission buffer region associated with the process, in which the transmitted data packet is stored until a corresponding acknowledgement for the transmitted data packet has been received from the MN. When said acknowledgement is received, the transmission buffer region is flushed, and the stored data packet is deleted.

Conversely, the mobile node has the same amount of processes as the radio control entity for the HARQ protocol, and uses the same particular process to receive the unicast data packet, that was used by the eNB to transmit the unicast data packet. In case the unicast data packet was decoded correctly in the mobile node, an acknowledgment is sent back, wherein the transmission buffer region in the eNB, associated with the process that was used to transmit the unicast data packet to the mobile node, is flushed.

However, in case the unicast data packet could not be decoded correctly, and the mobile node supports soft-combining, the unicast data packet is stored in the MN's soft-buffer region associated with the process assigned to said unicast data packet. At about the same time, a non-acknowledgment is transmitted to the eNB. The radio control entity must be able to unambiguously identify to which HARQ process the NACK or ACK refers to. This can be for example achieved by transmitting the HARQ feedback messages (ACK/NACK) after a predetermined time upon reception of a data packet. Based on the timing of the ACK/NACK signaling the radio control entity can identify the corresponding HARQ process and initiate a re-transmission of the data packet in case a NACK was received. A re-transmission is then performed for the retrieved unicast data packet to the mobile node, using the same HARQ process.

In turn, the mobile node receives the re-transmission data packet and knows from the assigned HARQ process ID where the initial data packet is located. Further, the mobile node retrieves the initial unicast data packet from the buffer region indicated by the HARQ process ID, assigned to the re-transmitted unicast data packet. Then, the mobile node can try to combine both unicast data packets (initial and re-transmitted) to correctly decode the unicast data packet, in which case an ACK is transmitted back to the eNB. This re-transmission process may be repeated until the unicast data packet is correctly decoded, however is usually restricted to a maximum number of possible re-transmission.

An N-process stop-and-wait HARQ protocol may be employed that has asynchronous re-transmissions in the DL and synchronous re-transmissions in the UL. Synchronous HARQ means that the re-transmissions of HARQ blocks occur at pre-defined periodic intervals. Hence, no explicit signaling is required to indicate to the receiver the re-transmission schedule. Conversely, asynchronous HARQ offers the flexibility of scheduling re-transmissions based on air interface conditions. In this case, some identification of the HARQ process needs to be signaled in order to allow for a correct combining and protocol operation.

Even though the exact number of HARQ processes hasn't been yet decided in 3GPP, most likely there will be 8 HARQ processes defined for LTE, thus using this number of processes for illustrating the following embodiments of the invention. However, a skilled person is easily capable of applying the general principles of the present invention to any number of HARQ processes.

The HARQ protocol operation for Downlink data transmission will be similar or even identical to HSDPA whereas HARQ protocol operation in Uplink will be similar to HSUPA.

Recently the support of HARQ with soft-combining has been agreed in 3GPP for multicast transmissions (e.g. MBMS). UEs in RRC_IDLE and RRC_CONNECTED state shall be able to receive MBMS re-transmissions and combine them with the original multicast transmissions at the HARQ level. However, the support of soft combining of multicast (re)transmissions is optional for a mobile. Further, only RRC_CONNECTED state UEs can be configured with an MBMS feedback mechanism, such as HARQ ACK/NACK signaling. eNB configures which MNs should send HARQ ACK/NACK feedback for multicast transmissions. Furthermore it allocates dedicated uplink feedback channels identical to those used in unicast transmission, which enables them to report the HARQ ACK/NACK. Where such a feedback mechanism is configured, AMC (Adaptive Modulation and Coding) is applied, and HARQ re-transmissions for MBMS are made on DL-SCH.

eNB decides whether a multicast re-transmission should take place based on the HARQ feedback from multiple UEs. Unlike in the unicast transmission case a NACK from a single mobile doesn't necessarily trigger a retransmission of the multicast data. As already mentioned, it's up to the eNB scheduler to decide whether a multicast re-transmissions should take place.

In order to allow for a correct HARQ protocol operation with soft-combining, the mobile needs to know when a re-transmission of a multicast data packet takes place. Furthermore, the mobile must be able to unambiguously identify which multicast service a potential re-transmission belongs to in order to allow for a correct soft-combining with an initial multicast data packet. There are different ways how to achieve this. One option would be to always send multicast re-transmission at a fixed timing after the initial transmission, i.e. synchronous re-transmissions. In this case a multicast re-transmission would also take place on a predefined time&frequency resource. Alternatively, the corresponding grant signaling for a multicast data packet could also identify a multicast re-transmission and the corresponding multicast service ID.

A first embodiment of the invention will be set out in the following.

Since the amount of soft-buffer memory at the receiving end (UE) is limited, it's crucial to avoid the need for extra soft-buffer memory in order to support HARQ operation with soft-combining for multicast transmissions. There is one soft-buffer memory in the mobile node, usually used and dimensioned for only unicast HARQ operation. The soft-buffer memory will be shared among unicast and multicast data in case the mobile is supporting simultaneous HARQ operation with soft-combining for both unicast and multicast transmissions. A characteristic of the common soft-buffer management procedure presented in this embodiment is to have a completely separate HARQ protocol operation for unicast and multicast transmissions. i.e. there is no dependency between HARQ operation of unicast and multicast transmissions. This avoids complexity in the UE respectively eNB.

Figure 4:
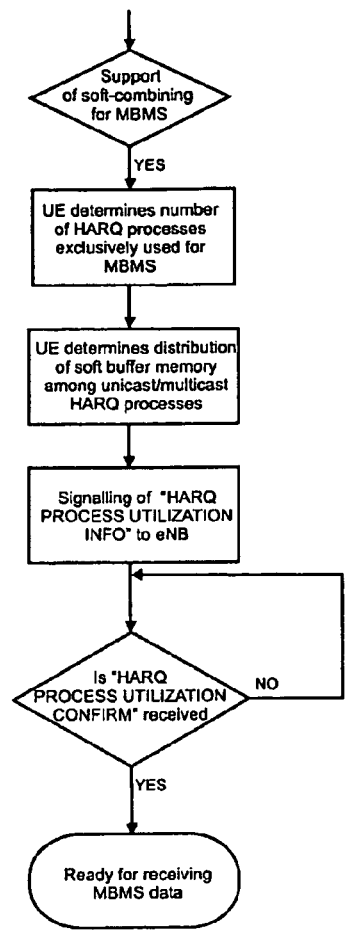
FIG. 4 is a flow chart, showing the steps performed for the configuration of a soft-buffer, supporting unicast and multicast transmissions, according to a specific embodiment of the invention.

FIG. 4 is a flow chart, illustrating the configuration steps of the MN's soft-buffer in order to support the reception of unicast and multicast transmissions. As a first step, MN decides on the soft-buffer sharing among unicast and multicast transmissions. That is, as mentioned above, the support of HARQ operation with soft combining for multicast is only optional for the MN. Therefore, the MN should first decide according to it's capability whether to support the combining feature for multicast as well. Provided that the MN will support the soft-combining feature for multicast transmissions, the UE needs then to determine the number of HARQ processes that are going to be used for multicast. The decision on how many HARQ processes to use for multicast transmission may be e.g. based on the number of multicast services the MN is expected to receive. In other words, there should be sufficient HARQ processes available to the MN, in order for the MN to be able to receive all multicast services to which the MN is subscribed. For instance, in case the MN is subscribed to two multicast services, there should be at least two HARQ processes that may be used for multicast data transmissions.

After having decided on the number of HARQ processes which the MN is able to support for multicast transmissions, the MN needs to decide on the amount of soft-buffer which will be associated with each of the HARQ processes for multicast. Since peak data rates of multicast transmissions will be most likely well below the peak data rates of downlink unicast transmissions, e.g. by a factor of 8, less soft-buffer needs to be assigned to those HARQ processes reserved for multicast transmissions. The remaining soft-buffer is then distributed among the HARQ processes reserved for unicast transmissions. Again, the MN may decide individually for each unicast HARQ process about how much soft-buffer it will be associated with. Alternatively, the remaining amount of soft-buffer can be spread equally among all unicast HARQ processes.

Figure 5:
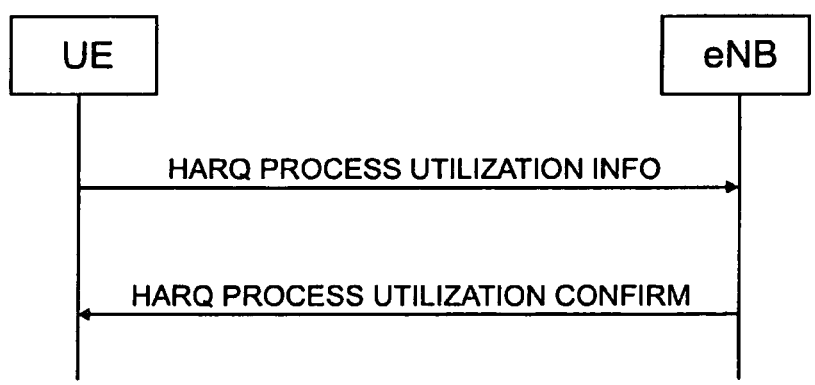
FIG. 5 is a signaling diagram, illustrating the exchange of configuration information between a MN and an eNB.

When the MN has completely finished the configuration of the soft-buffer for the support of unicast and multicast, the eNB needs to be informed about the exact configuration, in order to allow for a correct HARQ protocol operation. Based on this information, the eNB scheduler knows which HARQ processes can be used for DL unicast transmissions, i.e. scheduler can use the correct set of HARQ process IDs for DL grant signaling. Since this information should be very reliable, RRC signaling may be used. In FIG. 5 the corresponding signaling flow is shown, in which the MN sends the configuration information within a "HARQ PROCESS UTILIZATION INFO" message to the eNB. As already mentioned, the message includes information on the soft-buffer memory splitting for unicast/multicast transmissions and the information about which HARQ processes are exclusively used for multicast.

The information on HARQ process utilization within the "HARQ PROCESS UTILIZATION INFO" message could be signalled e.g. by means of a bitmap. Each bit in this bitmap corresponds to one HARQ process. Depending on whether the bit is set to 0 or 1, the corresponding HARQ process can be only used for unicast respectively multicast data transmissions. For instance, a bitmap "11000000" could mean that processes 1 and 2 can be used for multicast transmissions, whereas the remaining processes 3-8 are reserved for unicast transmissions.

Alternatively, the MN may explicitly signal the number and identities of the HARQ processes, which should be only used for multicast and/or unicast. For example, the MN signals to the eNB that HARQ processes 1 and 2 are used for multicast. Consequently, the eNB can infer that HARQ processes 3-8 will then be used for unicast. According to another example, the MN signals that HARQ processes 1 to (all available HARQ processes minus the number of reserved multicast HARQ processes) will be used for DL unicast transmissions. Thus, assuming a total number 8 HARQ processes and two multicast HARQ processes, the HARQ processes 1 to 6 will be used for unicast transmissions, and HARQ processes 7 and 8 for multicast transmissions.

However, as can be easily appreciated by a skilled person, there are several possibilities how to encode the configuration information of the HARQ process utilization transmitted in the "HARQ PROCESS UTILIZATION INFO" message. In the same way there are also several possibilities how to encode the information of the soft buffer memory splitting among the HARQ processes contained in the "HARQ PROCESS UTILIZATION INFO" message.

As shown in FIG. 5, the eNB acknowledges the correct reception of the "HARQ PROCESS UTILIZATION INFO" message by sending a "HARQ PROCESS UTILIZATION CONFIRM" message to the MN. As soon as the MN receives the confirm message, it is ready for receiving data via unicast and multicast transmissions.

Figure 6:
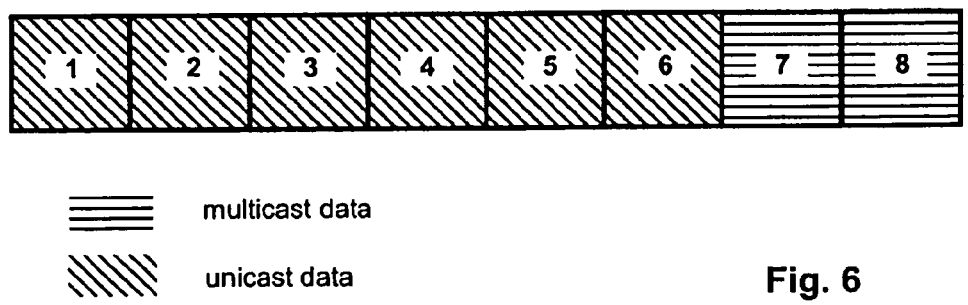
FIG. 6 shows an exemplary configuration of several HARQ processes, when the unicast and multicast operation is separated according to the specific embodiment of the invention.

FIG. 6 shows an exemplary configuration of HARQ processes for an unicast and multicast transmission according to the first embodiment of the invention. According to the latest status within 3GPP, there will be 8 HARQ processes defined for the HARQ protocol. Out of the 8 HARQ processes, the MN reserves two HARQ processes (with HARQ process IDs 7 and 8) exclusively for HARQ operation of multicast data only. Accordingly, only the first 6 HARQ processes (with HARQ process IDs 1-6) can be addressed by the eNB for DL unicast transmissions.

After having illustrated the necessary configuration of the soft-buffer for both unicast and multicast transmissions, we will explain below the actual operation of the HARQ protocol with soft-combining when receiving unicast and multicast data packets. We assume the HARQ process distribution according to FIG. 6. Nevertheless, this specific distribution should not be understood as restricting, but only as a possible exemplary configuration. Furthermore, parts of the following discussion are only by way of example too. For instance, the behaviour of the MN and the eNB regarding ACCK/NACK signaling is not essential to the general principles of the invention, and may thus be changed by a person skilled in the art without affection the operation according to the various embodiments of the invention. Rather, the illustrations should be understood only as assistance to fully understand how the principles of the invention may actually be implemented.

Similarly, the assumptions regarding the DL grant signaling are also a mere example and not essential to the principles of the invention.

The HARQ protocol operation for unicast DL transmissions when supporting also HARQ with soft-combining for multicast doesn't change, except for the fact that the number of HARQ processes available for unicast data are reduced to 6 due to the soft-buffer sharing with multicast data transmissions. Consequently, when the eNB wants to transmit a unicast data packet, it first decides on the HARQ process which shall be used for ensuring the correct transmission of said unicast data packet. One of the 6 available unicast HARQ processes 1-6 is chosen, and the unicast data packet is stored in the associated transmission buffer region. For instance, the eNB chooses HARQ process 3.

Then, the eNB transmits the DL grant on a control channel to the MN, in order to enable the mobile node to receive the unicast data packet. Besides indicating e.g. the resources via which the unicast data packet will be sent, the grant signaling for the unicast data packet also includes the HARQ process ID 3, identifying the HARQ process chosen by the eNB (see L1/2 grant signaling in the Background section). The eNB then actually sends the unicast data packet to the mobile node. Since, the MN receives the grant signaling first, it knows that a unicast data packet will be transmitted and is able to retrieve the unicast data packet from the air interface. When the decoding of the unicast data packet fails, the MN stores the unicast data packet in the soft-buffer region associated to the process indicated by the HARQ process ID (process 3) received with the grant signaling for the unicast data packet. The MN may also transmit a NACK to the eNB. As already mentioned before, there are several possibilities for the eNB to identify to which data packet the NACK belongs. For example, the ACK/NACK may be transmitted from the MN at a specific timing, thus the eNB knows when to expect the ACK/NACK for any data packet that was previously transmitted. Furthermore, the skilled person is aware of other possibilities so as the eNB can correctly assign an ACK/NACK to a previously transmitted data packet.

After having identified the correct data packet associated with the NACK and the corresponding HARQ process ID, the eNB retrieves the data packet from the transmission buffer region associated with the HARQ process 3, and re-transmits the unicast data packet to the MN. Correspondingly, the same HARQ process is used for the re-transmission, i.e. HARQ process 3. The grant signaling for the re-transmission of the unicast data packet again includes the corresponding HARQ process ID. Furthermore the grant signaling may also explicitly indicate whether the upcoming DL transmission is an initial transmission or a re-transmission of a data packet.

From the grant signaling, when receiving the re-transmitted unicast data packet, the mobile node already may know that the received unicast data packet is a re-transmission data packet for the data stored in the soft-buffer region associated with HARQ process 3. Consequently, the MN combines the initial unicast data packet and the re-transmitted unicast data packet and is thus able to correctly decode the relevant unicast data packet.

Resulting therefrom, the MN transmits an ACK to the eNB. Furthermore, the MN flushes the soft-buffer region associated with HARQ process 3, since the unicast data packet was correctly decoded, and the stored data therein is no longer necessary. The eNB also deletes the unicast data packet from its transmission buffer region corresponding to the HARQ process 3, and may start to transmit the next data packet of the unicast service.

For multicast transmissions the HARQ protocol operation is different compared to the unicast case. A multicast transmission is not addressed to a specific HARQ process by means of a HARQ process ID, as already discussed. This is because the HARQ status, i.e. the HARQ process utilization, is not synchronized among the multiple UEs that receive the multicast data packet. Instead, a multicast ID may be defined which is then signalled in the HARQ process ID field within the DL grant, in order for the MN to be able to recognize the multicast data packet as a data packet transmitted via multicast. However, there are also several other possibilities to indicate to the MN that a data packet is transmitted via multicast, e.g. via other IDs or fields in the DL grant signaling.

Moreover, when the eNB wants to transmit a multicast data packet, the eNB transmits, within the DL grant signaling for the multicast data packet, the above mentioned multicast ID. The eNB may store the multicast data packet in a transmission buffer. The multicast data packet is then transmitted to the mobile node, which receives the data packet as instructed by the DL grant signaling. Subsequently, after identifying the data packet as a multicast data packet, based on the multicast ID in the grant signaling, the MN tries to decode the data packet. In case the data packet could not be decoded correctly by the MN, the MN chooses by itself a HARQ process among the two possible HARQ processes 7 and 8. For instance, provided that HARQ process 8 is already in use for another multicast data packet of another multicast service, the MN chooses free HARQ process 7 for the multicast data packet and stores the same into the soft-buffer region associated with HARQ process 7. At the same time, the MN may send a NACK to the eNB so as to request the re-transmission of the data packet, depending on how the MN is configured by the eNB. As mentioned above a MN needs to be explicitly configured to signal HARQ feedback (ACK/NACK) to the eNB for multicast data packets. The NACK message is associated by the eNB to the correct initial data packet stored in the transmission buffer, by means of a special identifier within the NACK or by the specific timing used to transmit the ACK/NACKs from the mobile node, as already set out above.

Unlike in the unicast transmission case, a NACK from a single mobile node doesn't necessarily trigger a re-transmission of the multicast data packet. It's up to the scheduler of the eNB to decide whether a re-transmission for a given multicast data packet should take place.

Provided that the eNB decides for re-transmitting, the eNB retrieves the initial multicast data packet from the transmission buffer and performs a re-transmission for the multicast data packet. Accordingly, the DL grant may be signaled as well to the MN. Then, the MN receives the multicast data packet as indicated by the DL grant, and identifies the data packet as a multicast data packet, based on the multicast ID, which was again transmitted within the DL grant. Furthermore, the MN knows e.g. from the specific timing of the re-transmission that the multicast data packet is a re-transmission for the previously received data packet, stored in the soft-buffer region associated with the HARQ process 7. Consequently, both multicast data packets are combined for correctly decoding the actual multicast data packet, and in such a case the MN may be configured to transmit an ACK message may be transmitted to the eNB. The MN then flushes the corresponding soft-buffer region associated with HARQ process 7, since said data is no longer necessary.

Again, it depends upon the scheduler in the eNB how it reacts in response to the reception of the ACK message from the mobile node. However, provided that the eNB receives enough ACKs, the multicast data packet may be deleted from the transmission buffer, and the next multicast data packet for the multicast service is transmitted.

As has been explained in detail above, according to a first aspect of the invention, by strictly separating the operation of the HARQ protocol for unicast and multicast, it is possible to provide an efficient soft-buffer management for simultaneous unicast and multicast transmissions.

Moreover, we assume that a multicast data packet was received by the MN, which could not be decoded correctly, and is thus saved within a soft-buffer region associated with an HARQ process decided by the MN itself. The corresponding NACK message may be transmitted to the eNB which however decides not to re-transmit the multicast data packet for any reason, e.g. not enough NACKs have been received by the eNB. In said case, the HARQ process is reserved, though no re-transmission multicast data packet will ever be received for the data stored in the associated soft-buffer region. This negatively affects the resource management of the MN. In order to circumvent said problem, the soft-buffer region of said multicast HARQ process could be flushed when triggered for example by the expiry of a timer. Assuming that re-transmissions for multicast data occur within an predefined time window after the initial transmission took place, and that there is only a maximum of one re-transmission, a timer could be started in the MN whenever multicast data is stored in a soft-buffer. In more detail, the timer may be initiated when the MN stores a multicast data packet in the appropriate soft-buffer region. Then, upon expiry of the timer, the MN flushes the buffer. Thereby, it is avoided that HARQ processes and their associated soft-buffer regions are reserved in vain and for a too long time.

The subsequent discussion focuses on a second aspect of the invention, in which the multicast transmissions are considered as "normal" unicast transmission and are consequently treated in a similar way regarding the HARQ protocol operation. In contrast to the first aspect of the invention, in which the unicast and multicast operations of the HARQ protocol are strictly separated and independent, the HARQ operation will be dependent for unicast and multicast according to the second aspect of the invention. In particular, the unicast and multicast transmissions use the same HARQ processes and the associated soft-buffer regions. As already explained above, in order to allow for a correct HARQ protocol operation of unicast transmissions, the scheduler in the eNB needs to know which HARQ processes can be used for DL unicast transmissions. This was achieved for the first aspect of the invention by providing the separation between unicast and multicast. Since this separation no longer applies to the second aspect of the invention, the eNB would not know which process selected by the MN for a received (and erroneously transmitted) multicast data packet would be no longer available for unicast transmissions.

Certain rules for storing the multicast data into the soft-buffer need to be defined, wherein the rules are know to the MN as well as to the eNB.

Compared to the first aspect of the invention, it is no longer necessary to configure the soft-buffer for unicast and multicast. That is, no distribution of the HARQ processes is performed. Further, since each process may be used for unicast and multicast transmissions, it is also not possible to dimension the soft-buffer regions according to the peak data rates of particular services. Consequently, each HARQ process may be associated with the same amount of soft-buffer.

Alternatively, the associated soft-buffer regions of HARQ processes may have as well different amounts of soft-buffer. The initial configuration of the soft-buffer can be performed an determined by an operator of the MN.

However, it is advantageous that the eNB should be aware of whether a certain MN is using the feature of soft-combining for multicast transmissions, since said support is only optional for a MN. Otherwise, the eNB would always assume that a MN is applying soft-combining and would thus also respect those rules in the MN for selecting a HARQ process for received multicast transmissions. This would lead to HARQ process utilization inefficiencies in those cases the MN is actually not using the soft-combining feature for multicast transmissions. Therefore, after the MN decides in favor or against supporting soft-combining for multicast, the decision is signaled to the eNB. A similar signaling flow as shown in FIG. 5 could be applied to this case as well.

Furthermore, it may also be that the UE also indicates to the eNB the maximum number of HARQ processes the MN is going to use for multicast data transmissions. In said respect, after having decided for the support of soft-combining for multicast, the MN may decide next on the maximum number of HARQ processes which it will support for multicast data. Without knowing the maximum number of HARQ processes the mobile node is going to use for HARQ operation of multicast transmissions, the eNB may be forced to make a worst case assumption, e.g. the mobile node supports soft combining for every subscribed MBMS service. Therefore in order to allow for an synchronized status among mobile node and eNB, the eNB should be aware of the maximum number of HARQ processes used for multicast transmissions. In another embodiment of the invention the eNB may be also informed for what specific MBMS services the mobile supports HARQ operation with soft combining.

Figure 7:
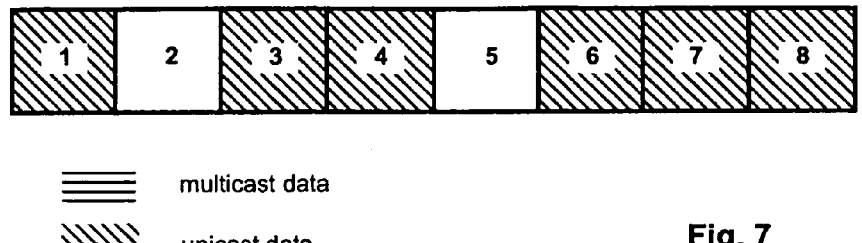
FIG. 7 shows an exemplary configuration of several HARQ processes, when the unicast and multicast operation shares the same soft-buffer according to another embodiment of the invention.
Figure 8:
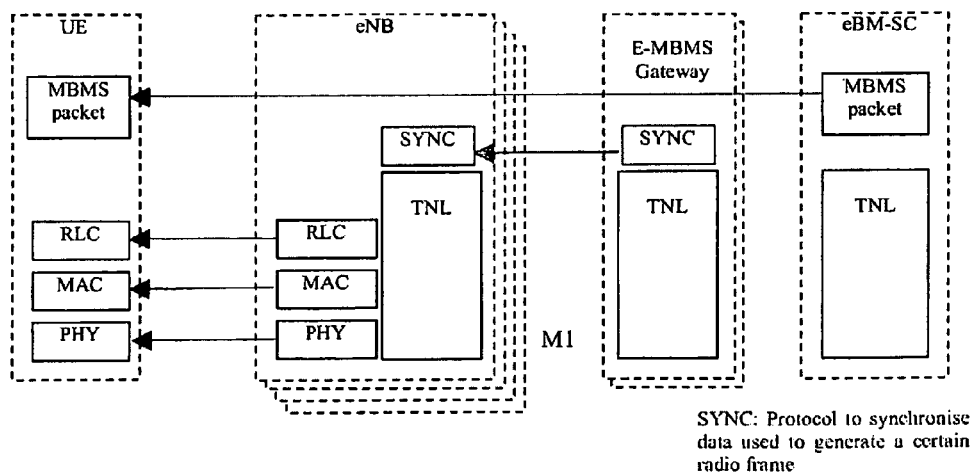
FIG. 8 shows the overall user-plane architecture provided for the multicast content synchronization.
Figure 9:
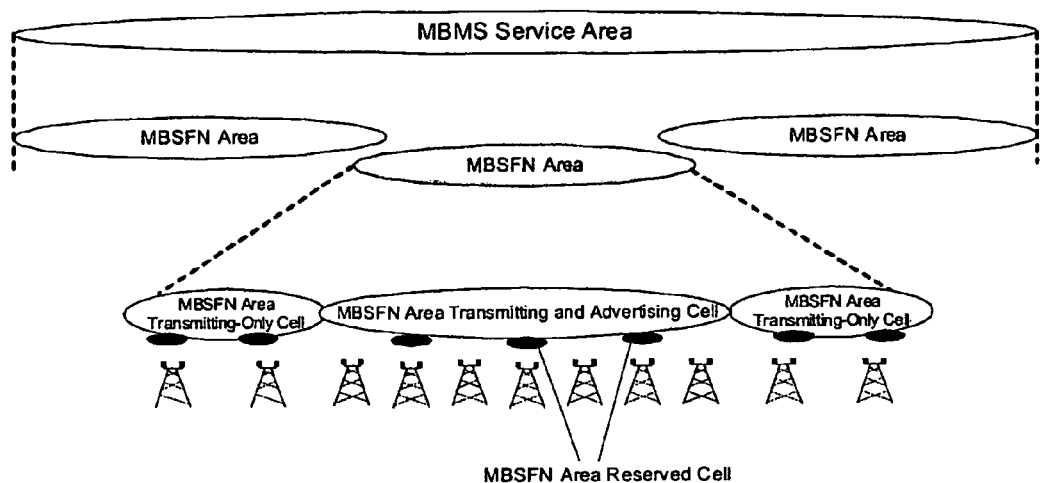
FIG. 9 illustrates the E-MBMS definitions introduced for LTE.

FIG. 7 shows an exemplary status of HARQ processes and will be employed to illustrate the use of rules for selecting the HARQ process to support soft-combining for a erroneously received multicast data packet. As apparent, HARQ processes 1, 3, 4 and 6-7 are already occupied by unicast transmissions. HARQ processes 2 and 5 are free and could be used for either unicast or multicast transmissions.

It should be noted that the below discussion focuses on a specific rule, however, other rules may be defined as well. A skilled person is aware that any rule known both to the MN and the eNB is able to provide the eNB with sufficient information to correctly address unicast data packets to a specific free HARQ process.

According to the following rule, a MN stores a multicast transmission, in case the data could not be decoded correctly, in the next free HARQ process beginning from the first HARQ process (HARQ process ID=1). A free HARQ process is a process where no data is currently stored in the associated soft-buffer region. Referring to the HARQ protocol status according to FIG. 7, the MN would assign an (erroneously decoded) received multicast data packet to HARQ process 2, since same is the free HARQ process with the lowest HARQ process ID. Accordingly, this HARQ process would not be used for DL unicast transmissions by the eNB scheduler. In more detail, the eNB knows the status of the HARQ processes 1, 3, 4 and 6-8 due to the unicast transmissions which the eNB has previously transmitted. Furthermore, the eNB infers that the just transmitted multicast data packet will be assigned by the MN to the HARQ process ID, according to the rule which the eNB has stored too. Therefore, the eNB is aware that HARQ process 2 is no longer available but reserved for the multicast data packet transmission. A following unicast transmission would thus be assigned by the eNB to HARQ process 5, the only remaining available HARQ process.

Alternatively, another rule may instruct the MN to use the free HARQ process with the highest HARQ process ID, in which case HARQ process 5 in FIG. 7 would be assigned by the MN to a received multicast data packet, which could not be decoded correctly. Accordingly, a skilled person might devise other rules too.

Similar to the flushing operation of the soft-buffer regions according to the first aspect of the invention, rules for flushing of the soft-buffer regions by multicast data packets need to be set up. Again, the flushing may be triggered by a timer, which may be initialized upon a multicast data packet is stored in a particular soft-buffer region.

Compared to the HARQ operation according to the first aspect of the invention, the HARQ operation for the second aspect of the invention differs in that the multicast transmission depends of the unicast transmissions, and vice versa. That is, the HARQ process used for multicast depends on the current status of HARQ processes used for unicast transmissions.

Therefore, an unsynchronized HARQ buffer status between MN and eNB due to HARQ feedback errors for unicast transmissions could lead to a situation where the mobile node stores a multicast data packet in a different HARQ process than expected by the eNB. For instance, in view of the HARQ process of FIG. 7, a unicast data packet assigned to HARQ process 2 is received in the MN. The MN decodes the unicast data packet correctly, and transmits an ACK message to the eNB. However, due to a feedback error, the eNB receives a NACK message for said unicast data packet. Consequently, the eNB believes that the MN could not decode the unicast data packet correctly and makes a re-transmission for said unicast data packet. Furthermore, in case a multicast data packet is transmitted afterwards to the MN, the MN, when receiving and failing in decoding the multicast data packet, assigns the multicast data packet to HARQ process 2, according to above discussed rule. However, when receiving the NACK, corresponding to the multicast data packet, from the MN, the eNB expects that the MN has stored the multicast data packet in HARQ process 5.

Consequently, some collisions might occur. Such problems don't exist in the HARQ operation according to the first aspect of the invention, since the HARQ protocol operation is strictly separated between unicast and multicast data transmissions.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technological Background section. Furthermore the concept of the invention may be also readily used in the LTE RAN currently discussed by the 3GGP.

The invention claimed is:

1. A method for transmitting data packets from a radio control entity to a mobile node in a unicast and multicast transmission mode, wherein a re-transmission protocol uses a plurality of processes for the transmission of the unicast and multicast data packets, the re-transmission protocol using a receiving buffer in the mobile node, comprising a plurality of regions each associated with one of the plurality of processes of the re-transmission protocol, to store therein received data packets, which could not be decoded correctly by the mobile node, for later use with corresponding re-transmission data packets, the method comprising the steps of:
   configuring the receiving buffer of the re-transmission protocol in the mobile node for use with the unicast and the multicast transmission mode, wherein the receiving buffer is divided into a unicast section and a multicast section, and the plurality of regions of the receiving buffer with the associated plurality of processes are distributed among the unicast and multicast section,
   informing the radio control entity about the distribution of the regions of the receiving buffer and the associated processes among the unicast section and the multicast section,
   transmitting by the radio control entity a unicast data packet and a Hybrid Automatic Repeat Request (HARQ) process ID to the mobile node, wherein the unicast data packet is assigned to a process belonging to the unicast section of the receiving buffer based on the received HARQ process ID,
   transmitting by the radio control entity a multicast data packet to the mobile node, and
   deciding on, by the mobile node, the HARQ process ID belonging to the multicast section of the receiving buffer,
   wherein the multicast data packet is assigned to the decided process belonging to the multicast section of the receiving buffer.

2. The method according to claim 1, wherein upon receiving a multicast data packet from the radio control entity, in case the multicast data packet could not be decoded correctly, the mobile node assigns the multicast data packet to a process belonging to the multicast section.

3. The method according to claim 1, wherein the step of configuring the receiving buffer of the re-transmission protocol comprises: deciding on the number of processes to be assigned to the unicast and multicast section, deciding on the amount of receiving buffer constituting the corresponding region of the receiving buffer associated with each of the processes assigned to the unicast and multicast section, and wherein the radio control entity is informed about the number of processes and the amount of receiving buffer of each region associated with a process that is assigned to the unicast and multicast section.

4. The method according to claim 1, wherein the step of informing the radio control entity about the distribution of the regions comprises: transmitting a configuration information message from the mobile node to the radio control entity, the configuration information message comprising a bitmap, wherein each bit of the bitmap corresponds to one process of the plurality of processes of the re-transmission protocol and indicates whether the corresponding process belongs to the unicast or multicast section of the receiving buffer.

5. The method according to claim 1, wherein the step of informing the radio control entity about the distribution of the regions comprises: transmitting a configuration information message from the mobile node to the radio control entity, the configuration information message comprising identification information of those processes of the plurality of processes that are assigned to the unicast section of the receiving buffer, and/or comprising identification information of those processes of the plurality of processes that are assigned to the multicast section of the receiving buffer.

6. The method according to claim 1, wherein a region of the multicast section, storing a received multicast data packet, is emptied upon the expiry of a timer, the timer being initiated when the re-transmission protocol stores the multicast data packet in said region of the multicast section.

7. A radio control entity for transmitting data packets to a mobile node in a unicast and multicast transmission mode, wherein a re-transmission protocol uses a plurality of processes for the transmission of the unicast and multicast data packets, the re-transmission protocol using a receiving buffer in the mobile node, comprising a plurality of regions each associated with one of the plurality of processes of the re-transmission protocol, to store therein received data packets, which could not be decoded correctly by the mobile node, for later use with corresponding re-transmission data packets, the radio control entity comprising:
 a receiver configured to receive from the mobile node information about a division of the receiving buffer into a unicast and multicast section and about the distribution of the regions of the receiving buffer and the associated processes among the unicast and multicast section,
 a transmitter configured to transmit a unicast data packet and a Hybrid Automatic Repeat Request (HARQ) process ID to the mobile node, wherein the unicast data packet is assigned to a process belonging to the unicast section of the receiving buffer based on the received HARQ process ID, and
 the transmitter is further configured to transmit a multicast data packet to the mobile node, wherein the multicast data packet is assigned to a process belonging to the multicast section of the receiving buffer, the HARQ process ID belonging to the multicast section being a preselected process ID decided on by the mobile node.

8. The radio control entity according to claim 7, wherein the mobile node decides on the number of processes assigned to the unicast and multicast section, and decides on the amount of receiving buffer constituting the corresponding region of the receiving buffer associated with each of the processes assigned to the unicast and multicast section, and wherein the receiver is further configured to receive from the mobile node information on the decided number of processes and the decided amount of receiving buffer of each region associated with a process.

9. The radio control entity according to claim 7, wherein the receiver is further configured to receive from the mobile node a configuration information message, comprising a bitmap, wherein each bit of the bitmap corresponds to one process of the plurality of processes of the re-transmission protocol and indicates whether the corresponding process belongs to the unicast or multicast section of the receiving buffer.

10. The radio control entity according to claim 7, wherein the receiver is further configured to receive from the mobile node a configuration information message, comprising identification information of those processes of the plurality of processes that are assigned to the unicast section of the receiving buffer, and/or comprising identification information of those processes of the plurality of processes that are assigned to the multicast section of the receiving buffer.

11. The radio control entity of claim 7, wherein the transmitter is further configured to transmit to the mobile node second control information, for enabling the reception of the multicast data packet in the mobile node, the second control information comprising a predetermined indicator indicating that the corresponding data packet will be transmitted to the mobile node in a multicast transmission mode.

12. A mobile node for receiving data packets from a radio control entity transmitted in a unicast and multicast transmission mode, wherein a re-transmission protocol uses a plurality of processes for the transmission of the unicast and multicast data packets, the re-transmission protocol using a receiving buffer in the mobile node, comprising a plurality of regions each associated with one of the plurality of processes of the re-transmission protocol, to store therein received data packets, which could not be decoded correctly by the mobile node, for later use with corresponding re-transmission data packets, the mobile node comprising:
 a processor configured to configure the receiving buffer of the re-transmission protocol for use with the unicast and multicast transmission mode, by dividing the receiving buffer into a unicast section and a multicast section, and distributing the plurality of regions of the receiving buffer and the associated plurality of processes among the unicast and multicast section,
 a transmitter configured to inform the radio control entity about the distribution of the regions of the receiving buffer and the associated processes among the unicast section and the multicast section; and
 a receiver configured to receive from the radio control entity a unicast data packet and a Hybrid Automatic Repeat Request (HARQ) process ID, assigned to a process belonging to the unicast section of the receiving buffer based on the receiving HARQ process ID, wherein:
 the receiver is further configured to receive from the radio control entity a multicast data packet,
 a processor is configured to decide on the HARQ process belonging to the multicast section of the receiving buffer,
 the receiver is configured to assign the multicast data packet to the decided HARQ process belonging to the multicast section of the receiving buffer, the HARQ process ID belonging to the multicast section being a preselected process ID decided on by the mobile node.

13. The mobile node according to claim 12, further comprising: a processor configured to assign a received multicast data packet to a process belonging to the multicast section, in case the processor could not decode the multicast data packet correctly.

14. The mobile node according to claim 12, wherein:
 the processor is further configured to decide on the number of processes to be assigned to the unicast and multicast section,
 the processor is further configured to decide on the amount of receiving buffer constituting the corresponding region of the receiving buffer associated with each of the processes assigned to the unicast and multicast section, and
 the transmitter is configured to inform the radio control entity about the number of processes and the amount of receiving buffer of each region associated with a process.

15. The mobile node of claim 12, wherein: the transmitter is configured to transmit to the radio control entity a configuration message, comprising a bitmap, wherein each bit of the bitmap corresponds to one process of the plurality of processes and indicates whether the corresponding process belongs to the unicast or multicast section.

16. The mobile node of claim 12, wherein: the transmitter is configured to transmit to the radio control entity a configuration message, comprising identification information of those processes of the plurality of processes that are assigned to the unicast section, and/or comprising identification, information of those processes that are assigned to the multicast section.

17. The mobile node of claim 12, wherein the receiver is further configured to receive from the radio control entity second control information, for enabling the reception of the multicast data packet in the mobile node, the second control information comprising a predetermined indicator indicating that the corresponding data packet will be transmitted to the mobile node in a multicast transmission mode, a processor is configured to identify the received multicast data packet as a data packet transmitted in the multicast transmission mode based on the predetermined indicator in the second control information, and the processor is further configured to store the multicast data packet in a region associated to a process belonging to the multicast section, in case the processor could not decode correctly the multicast data packet.

18. The mobile node of claim 12, wherein a processor is configured to empty a region of the receiving buffer, storing a received multicast data packet, upon the expiry of a timer, wherein the processor is configured to initiate the timer when the multicast data packet is stored in the region of the receiving buffer.

* * * * *